(12) United States Patent
Tachikawa

(10) Patent No.: US 7,437,600 B2
(45) Date of Patent: Oct. 14, 2008

(54) METHOD OF DATA WRITING TO AND DATA READING FROM STORAGE DEVICE AND DATA STORAGE SYSTEM

(75) Inventor: Takashi Tachikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 619 days.

(21) Appl. No.: 11/060,553

(22) Filed: Feb. 18, 2005

(65) Prior Publication Data

US 2005/0185476 A1    Aug. 25, 2005

(30) Foreign Application Priority Data

Feb. 19, 2004   (JP)   ............................. 2004-043101

(51) Int. Cl.
    *G06F 11/00*   (2006.01)
(52) U.S. Cl. ............................................. 714/6; 714/7
(58) Field of Classification Search ................ 714/6
    See application file for complete search history.

(56) References Cited

U.S. PATENT DOCUMENTS

| | | | |
|---|---|---|---|
| 6,532,548 B1 * | 3/2003 | Hughes ......................... | 714/6 |
| 7,058,762 B2 * | 6/2006 | Patterson et al. ............. | 711/114 |
| 7,146,461 B1 * | 12/2006 | Kiselev et al. ............... | 711/114 |
| 7,281,159 B2 * | 10/2007 | Gold ............................. | 714/7 |
| 2002/0042893 A1 * | 4/2002 | Larson et al. ................. | 714/7 |
| 2003/0088805 A1 * | 5/2003 | Majni et al. .................... | 714/6 |
| 2003/0159092 A1 * | 8/2003 | La Fetra ....................... | 714/710 |
| 2003/0233611 A1 * | 12/2003 | Humlicek et al. ........... | 714/763 |
| 2005/0114729 A1 * | 5/2005 | Nielsen et al. ................ | 714/7 |
| 2005/0138284 A1 * | 6/2005 | Cohn et al. .................. | 711/114 |
| 2005/0166085 A1 * | 7/2005 | Thompson et al. ............. | 714/6 |
| 2007/0022364 A1 * | 1/2007 | McBryde et al. ............ | 714/801 |

FOREIGN PATENT DOCUMENTS

| | | | |
|---|---|---|---|
| JP | 2000-173289 A | 6/2000 | |
| JP | 2002-288034 A | 10/2002 | |

OTHER PUBLICATIONS

"RAID technology and its applications and development in the field of video"; TV Engineering; vol. 1; 2002; pp. 78-84.

\* cited by examiner

*Primary Examiner*—Marc Duncan
(74) *Attorney, Agent, or Firm*—Sughrue Mion, PLLC

(57) ABSTRACT

Reliability of stored data in a semiconductor storage device such as a flash memory is enhanced. There are provided (n+1) physical storage regions each having m data storage areas and for which data writing, data reading, data erasure, and the like are collectively performed. A sequence of data input from a supervisory host as write data are rearranged, and that sequence of data is split across the n physical storage regions, for storage. Error correction data for the sequence of data 1 to data n split across the respective physical storage regions is stored in another (n+1)th physical storage region as data p1. Error correction data p2 for data (n+1) to data 2n, and error correction data pm for data ((m−1)n+1) to data mn are stored in the same manner. When abnormality is present in part or all of the data stored in a second physical storage region, for example, the data in the second physical storage region restored by error correction is stored in an alternative physical storage region, and the data in the second physical storage region are all erased.

17 Claims, 14 Drawing Sheets

DATA ARE INPUT IN THE ORDER OF
(1, 2, 3, 4), (5, 6, 7, 8), (9, 10, 11, 12),
AND (13, 14, 15, 16)

METHOD OF DATA WRITING TO AND DATA READING FROM STORAGE DEVICE AND DATA STORAGE SYSTEM

FIELD OF THE INVENTION

The present invention relates to a method of data writing to and data reading from a storage device. More specifically, the invention relates to the method of data writing to and data reading from a semiconductor memory device such as a flash memory.

BACKGROUND OF THE INVENTION

The storage capacity of a data storage device typified by a semiconductor memory in an information device such as a computer, a PDA (Personal Data Assistance, Personal Digital Assistants: Personal Portable Type Information Communication Device), a household game device, a digital camera, or a cellular phone, or a PHS (Personal Hand-phone System) keeps on increasing year by year. The flash memory in particular, which is a ROM (Read Only Memory) that can perform electrical erasure of and electrical writing to storage, is a nonvolatile memory from which the storage does not vanish even if external power is not supplied thereto, and is used a lot in various fields.

The flash memory also has a characteristic in which all data are collectively erased or erasure is performed block by block which is a unit of data erasure, and data writing or data reading is performed on a block-by-block basis (refer to Patent Documents 1 and 2).

The mounted capacity of the flash memory has hitherto been smaller than that of other storage device due to constraints in view of its manufacture and price. However, due to the emergence of a large capacity type memory resulting from development of a NAND-type flash memory enabling manufacture of a comparatively cheap and large-capacity memory and an NOR-type flash memory of a multi-value logical type, and an increase in the demand of a large capacity nonvolatile memory due to the spread of digital cameras and higher functions of cellar phones, the storage capacity of the nonvolatile-type semiconductor memory has been remarkably increased.

However, in many cases, due to its configuration, the NAND-type memory is based on the premise that a certain defective region may be included therein at the time of shipment to a manufacturer. Further, the NAND-type memory is often based on the premise that defects may be generated with a certain probability or in a certain amount after shipped to the manufacturer. Further, the reliability of the NOR-type flash memory, which has hitherto had higher reliability than that of other storage device, in terms of data storage, is more reduced than before because of multivaluing or the like.

[Patent Document 1]
JP Patent Kokai Publication No. JP-P2000-173289A
[Patent Document 2]
JP Patent Kokai Publication No. JP-P2002-288034A

SUMMARY OF THE DISCLOSURE

As described above, in the storage device such as the flash memory, due to the influence of the increased capacity, reliability of data has been more reduced than before. Thus, a situation has also arisen in which it is difficult to use the storage device as it be, as means for storing important data that directly affects system operations. For this reason, it often happens that the storage region in which a defect has occurred once is not to be used thereafter, and there arises the need for preparing a lot of backup regions for alternative regions. Thus, it has become difficult to use the storage capacity efficiently.

Further, error detection and error correction have been traditionally performed by adding redundant data such as a parity to each of certain arbitrary data units (refer to the Patent Documents 1 and 2) for error correction of data. However, since part or all of data paired with this error correction data are normally stored within one physical storage region, there was the problem that when a data error or the like has arisen due to a physical defect, most of a group of data would be lost and the error correction would be impossible, In view of the problems described above, an object of the present invention is therefore to provide measures for enhancing reliability of stored data in a semiconductor storage device such as a flash memory and also enabling efficient use of storage regions through reuse of a region which has become defective as well.

According to a first aspect of the present invention, there is provided a method of data writing to and data reading from a storage device comprising storage means constituted from a plurality of physical storage regions each including a plurality of data storage areas, an operation of the data writing or the data reading being collectively performed for each of the plurality of physical storage regions.

In the method, when data storage in the storage means is performed, a sequence of data input from a supervisory host to be written in each of the plurality of physical storage regions is rearranged, thereby being split across the plurality of physical storage regions, for writing, and when the data reading from the storage means is performed, the data collectively read from each of the plurality of physical storage regions are rearranged again, thereby being returned to the input sequence of data, for output.

According to a second aspect of the present invention, there is provided an error correcting physical storage region with error correction data written therein, the error correction data being provided for correcting errors of the data respectively written into corresponding positions of the plurality of physical storage regions.

In this aspect, when one of the errors is detected in one of the data stored in the plurality of physical storage regions, all of the data in one of the plurality of physical storage regions with the data error detected therein are checked, a normal one of the data is saved and written into a corresponding position in an alternative physical storage region, and the data having the error is corrected using the error correction data in the error correcting physical storage region and written into a corresponding position in the alternative physical storage region, and all the data in one of the plurality of physical storage regions in which the data error has been detected are erased.

According to a third aspect of the present invention, when the erasure of all the data in one of the plurality of physical storage regions in which the data error has been detected has succeeded as a result of the data erasure, one of the plurality of physical storage regions is registered as an alternative candidate storage region for being usable again as the alternative physical storage region, and when the erasure of all the data in one of the plurality of physical storage regions in which the data error has been detected has failed, one of the plurality of physical storage regions is registered as a defective physical storage region and managed not to be used from then on.

According to a fourth aspect of the present invention, there is provided a data storage system.

The data storage system comprises:

storage means constituted from a plurality of physical storage regions each having a plurality of data storage areas, an operation of data writing or data reading being collectively performed for each of the plurality of physical storage regions;

rearrangement means having a function of rearranging data input from a supervisory host to be written to the storage means, for output to the storage means and a function of rearranging the data read from the storage means, for output to the supervisory host; and control means for controlling operations of the storage means and the rearrangement means; wherein the rearrangement means has a function of rearranging a sequence of the data input from the supervisory host to be written in each of the plurality of physical storage regions, thereby splitting the rearranged data across the plurality of physical storage regions, for writing, and a function of rearranging the data collectively read from each of the plurality of physical storage regions again, thereby returning the rearranged data to the input sequence of data, for output.

Further, an error correcting physical storage region with error correction data written therein is provided for the storage means, the error correction data being provided for correcting errors of the data respectively written into corresponding positions of the plurality of physical storage region, and the control means has a function of performing control so that when one of the errors is detected in one of the data stored in the storage means, all of the data in one of the plurality of physical storage regions with one of the errors detected therein are checked, the data determined to be normal as a result of the check is saved and written into a corresponding position in an alternative physical storage region and the data determined to have the error is corrected using the error correction data in the error correcting physical storage region and is written into a corresponding position in the alternative physical storage region, and all the data in one of the plurality of physical storage regions in which the data error has been detected are erased.

More specifically, in the present invention, in the data storage system such as a flash memory, each data has a configuration in which the data and error correction information thereof are arranged across physical units of storage regions in which a defect may occur. Thus, even if the defect has occurred in a physical unit of data storage regions in which an arbitrary defect may occur, restoration to the original data can be thereby readily performed.

The meritorious effects of the present invention are summarized as follows.

According to the present invention, a sequence of data to be stored in one physical storage region is split across a plurality of physical storage regions, for storage, and error correction data thereof is also stored in another physical storage region. Thus, even if data reading from one or an arbitrary number of physical regions which can be error-corrected has become impossible due to various defects including a defect at the time of manufacture and a malfunction generated in a specific area such as damage caused by electrical migration or static electricity, restoration of data becomes readily possible.

Further, even if an error has occurred in a physical storage region, an operation is performed in which the physical storage region is erased and reused if it is reusable. Thus, even if the storage device has inferior long-term storage stability of data, the device can be used with a certain degree of reliability.

Further, the data storage method is different from a conventional data storage method: a sequence of data that should be originally stored in one physical storage region is split across (or over) a plurality of physical storage regions for storage. In addition, by encrypting the order of data storage or the like, a configuration can be made in which data cannot be read out normally even if only the storage device for which writing has been performed is connected to other system. Therefore, the present invention can also be utilized for security applications.

PREFERRED EMBODIMENTS OF THE INVENTION

Figure 1:
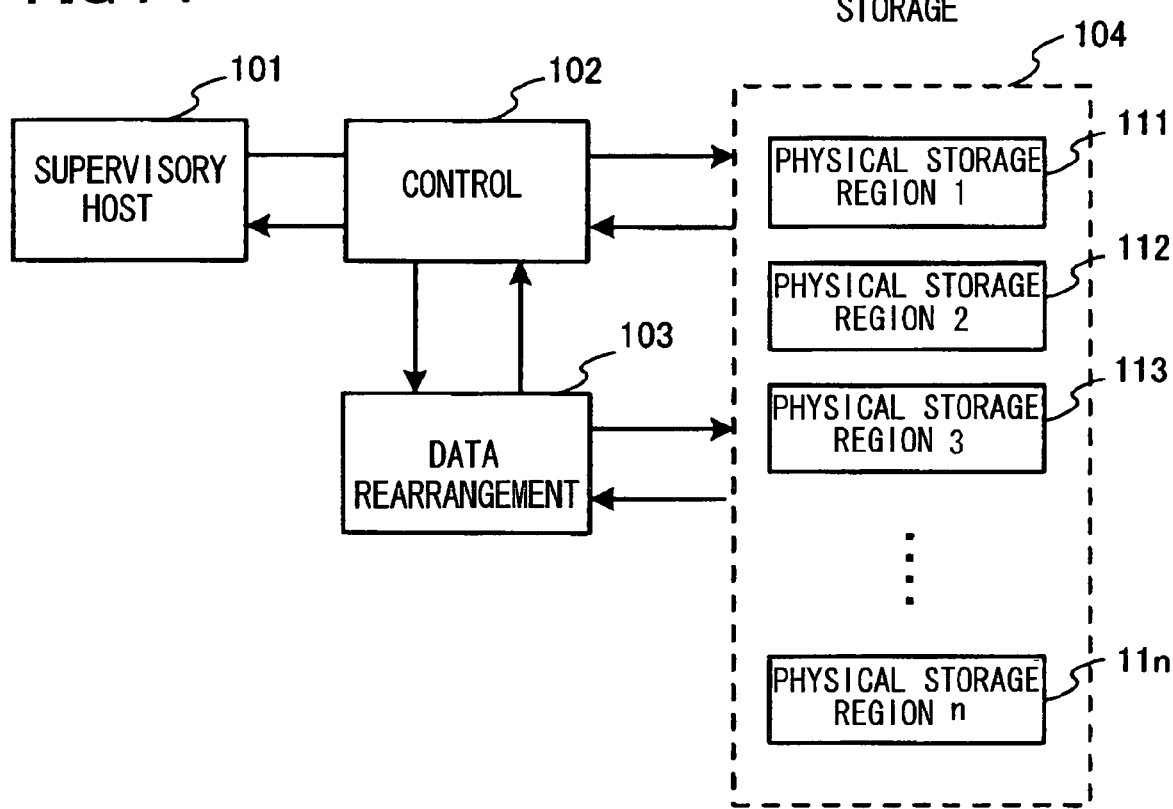
FIG. 1 is a block diagram of a data storage system showing a first embodiment of the present invention.

FIG. 1 is a block diagram of a data storage system showing a first embodiment of the present invention.

The data storage system in this embodiment has storage means (unit) 104 including n physically divided storage regions constituted from a physical storage region 111, a physical storage region 112, and a physical storage region 11n. Each physical storage region is the storage region having a group of functions that simultaneously operate during either or all of operations such as data writing, data reading, and data erasure, and shows a group of areas in which various defects may occur. These defects include a defect at the time of manufacture, a malfunction generated in a specific area such as damage caused by electrical migration or static electricity, a defective control circuit, and a malfunction caused by the influence of stability of a supply voltage.

Figure 2:
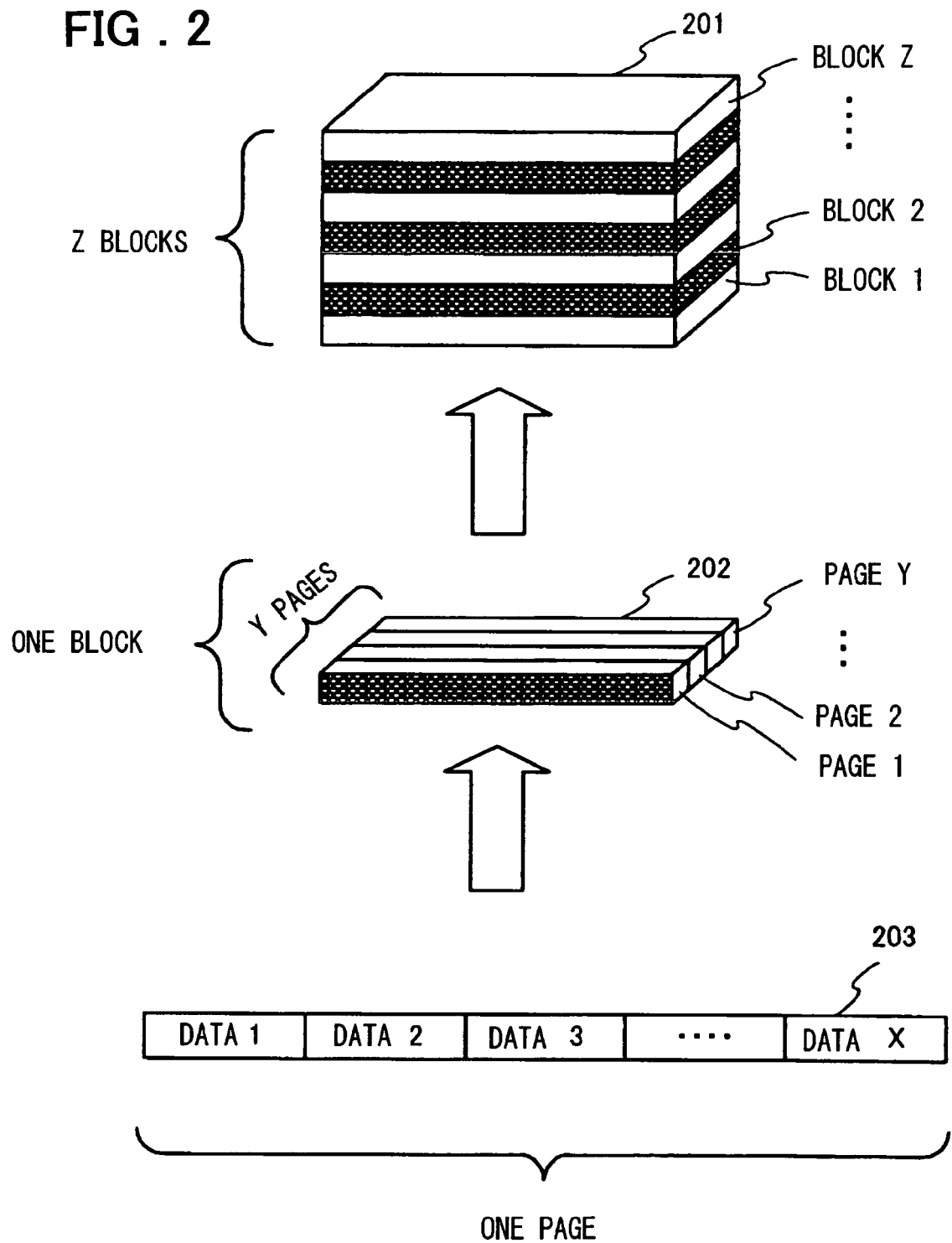
FIG. 2 is a diagram showing a configuration of data storage in a flash memory of related art.

FIG. 2 shows a configuration of data storage in a flash memory. In the flash memory, a minimum unit of data for data reading such as the unit of a byte or a word, is grouped from data 1 to data X, and the group of these consecutive X units of data is stored as one page. Then, generally, the flash memory supporting high-speed reading often includes the function of reading in the unit of this page.

Herein, a group of these Y pages is defined as one block. Being different from an EEPROM (Electronically Erasable and Programmable Read Only Memory), the flash memory can only perform erasing in the unit of this block. In addition to this, generally, the NAND-type flash memory can only perform reading and writing by this block by block. Herein, a group of Z blocks constitutes one flash memory. In this embodiment, the block defined herein is regarded as the unit of the physical storage region, and a description is directed to a storage device including Z physical storage regions, as a specific example.

The data storage system in this embodiment is characterized by including data rearrangement means (unit) 103. This data rearrangement means 103 performs rearrangement of a sequence of data sequentially input to a plurality of (n) physical storage regions (blocks) in storage means 104 for storage, and splits the data that should be originally stored in one physical storage region as one group of continuous data across the plurality (n) physical storage regions, for storage.

Generally, the flash memory has only the function of reading and writing data within one physical storage region as continuous data, such as reading page by page. Then, if reading and writing that are the same as before are performed on the storage device stored according to this embodiment, a supervisory host 101 such as a common CPU (Central Arithmetic Processing Unit), cannot handle the data without alteration, because arrangement of the data is different. For this reason, a data string readout from the plurality (n) physical storage regions, respectively, is rearranged by the data rearrangement means 103 again and then converted to a data string that can be handled by the common CPU or the like. The data can be thereby handled by the supervisory host 101 without alteration.

Control means (unit) 102 is the means for controlling the storage means 104 and the data rearrangement means 103, and performs control over reading of data from the storage means (unit) 104 and control over writing of data to the storage means 104 in response to data reading and writing requests from the supervisory host 101, respectively. Further, switching between data reading and data writing and transmission and reception of various control signals such as a chip select signal and an address specification signal are also performed by this control means 102.

In the data storage system in this embodiment, a data signal for performing transmission and reception of readout data and written data is assumed to be connected to the data rearrangement means 103, while an address signal indicating an address for execution of data reading and writing is assumed to be connected to the storage means 104. However, depending on the embodiment, various connection methods can be conceived. The data signal (data bus) is connected between the data rearrangement means 103 and the storage means 104, and data to be written into the storage means 104 or data to be read out from the storage means 104 are invariably rearranged by the data rearrangement means 103 and then output to the storage means 104 or the supervisory host 101. The supervisory host 101 is the means for requesting data reading and data writing to the control means 102, and is a data processing device such as the CPU or a memory controller.

Figure 3:
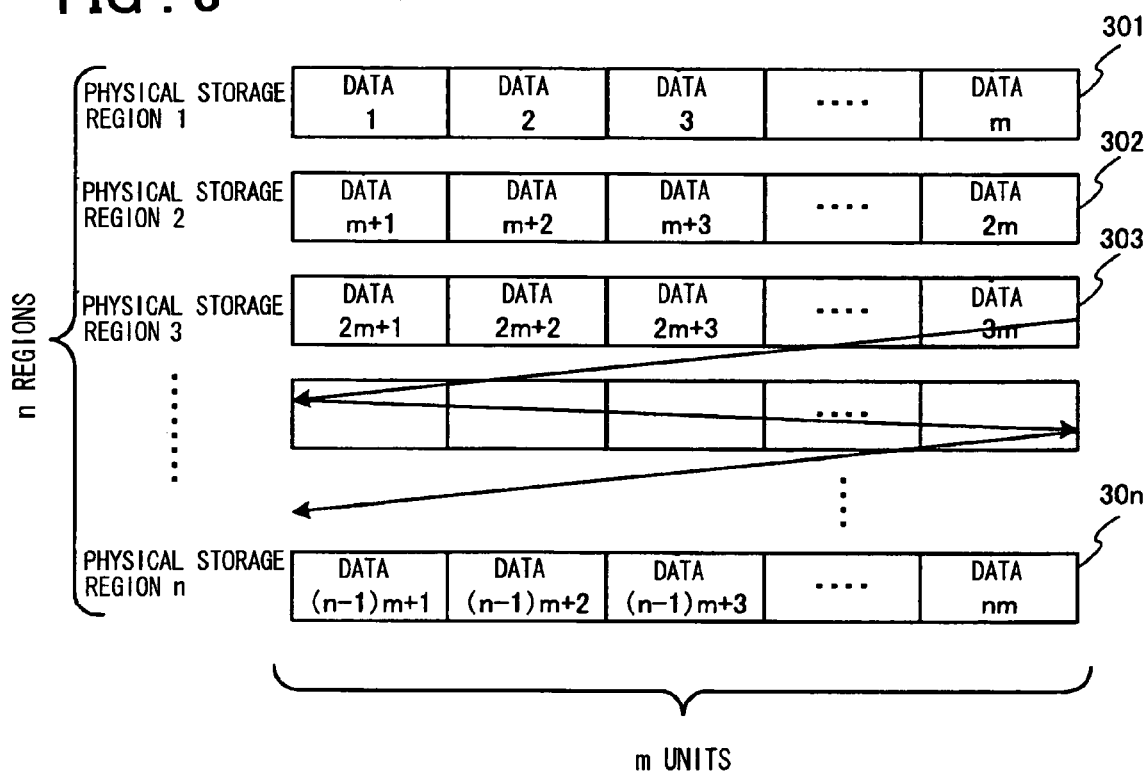
FIG. 3 is a diagram showing a conventional data storage method.
Figure 4:
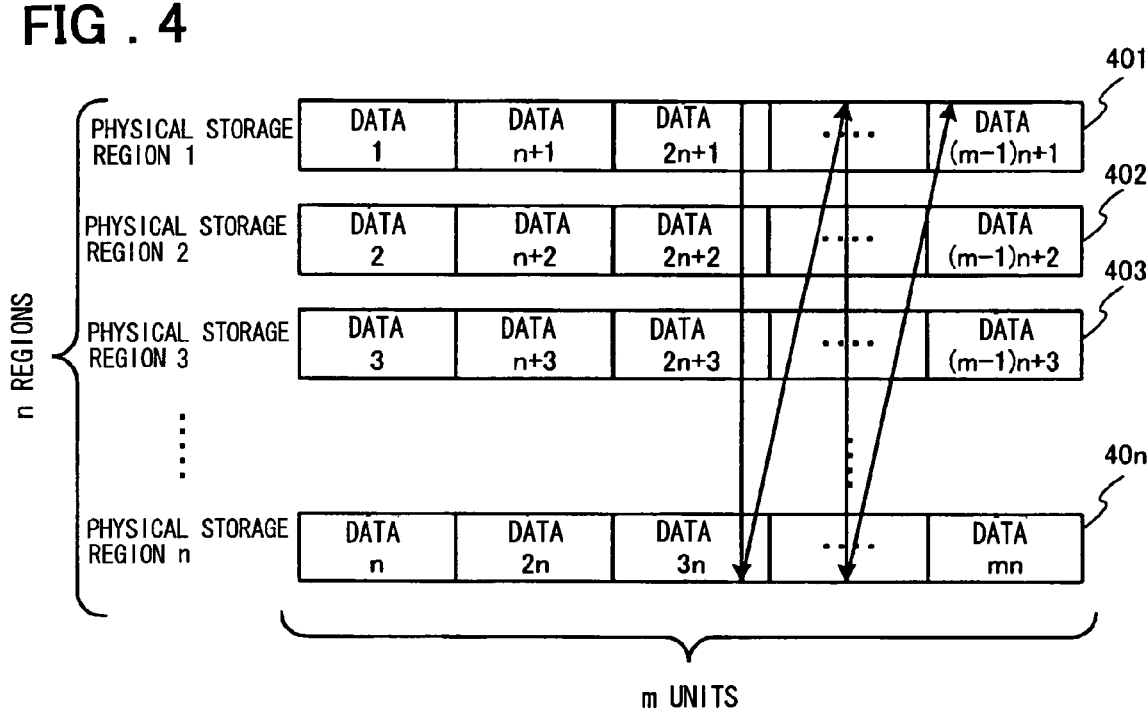
FIG. 4 is a diagram showing a data storage method in this embodiment.

FIGS. 3 and 4 are diagrams for explaining a conventional data storage method and a data storage method in this embodiment, respectively. FIGS. 5 and 6 are configuration diagrams showing examples of the data rearrangement means for implementing the data storage method in this embodiment. An operation of this embodiment will be described below with reference to FIGS. 1 to 6.

As shown in FIG. 3, the storage means 104 includes the n physical storage regions such as a first physical storage region (301), a second physical storage region (302), and . . . an nth physical storage region (30n). The physical storage region herein corresponds to the block, which is the minimum unit of erasure in the flash memory having a structure as shown in FIG. 2, for example. Referring to FIG. 3, one physical storage region (block) has m data storage areas. Then, the storage means 104 has m×n data storage areas, in this example.

Generally, the amount of data that can be stored in one data storage area is often a unit of data such as one byte, two bytes (=one word), or four bytes (=two words). In a conventional data storage system, after one physical storage region has been filled, data is stored in the physical storage region contiguous thereto: data constituted from (data 1) to (data m) are stored in the first physical storage region (301), (data m+1) to (data 2m) are stored in the second physical storage region (302) contiguous thereto, (data 2m+1) to (data 3m) are stored in a third physical storage region (303), and (data (n−1)m+1) to (data nm) are included in the nth physical storage region (30n), as shown in FIG. 3.

On the other hand, in the data storage system in this embodiment, the data are sequentially stored across the areas of different physical storage regions as follows:

(data 1) is stored in the first area of a first physical storage region (401), (data 2) is stored in the first area of a second physical storage region (402), (data 3) is stored in the first area of a third physical region (403), and (data n) is stored in the first area of an nth physical storage region (40n). Next, (data n+1) is stored in the second area of the first physical storage region (401), (data n+2) is stored in the second area of the second physical storage region (402), (data 2n) is stored in the second area of the nth physical storage region (40n), (data (m−1)n+1) is stored in the mth area of the first physical storage region (401), and (data mn) is stored in the mth area of the nth physical storage region (40n).

As described above, in the data storage method in this embodiment, data is stored in the storage means 104 in an order different from that for the prior art. Thus, the data without alteration is difficult to use as they be (without specific modification or rearrangement). Then, the data collectively read out from the respective physical storage regions of the storage means 104 are rearranged by the data rearrangement means 103, for output to the supervisory host 101 or write data sent from the supervisory host 101 are rearranged and then written into the storage means 104. Accordingly, in this embodiment, the areas for storing (m×n) units of data (or the n physical storage regions) function as the size for collective data writing or collective data reading.

Figure 5A:
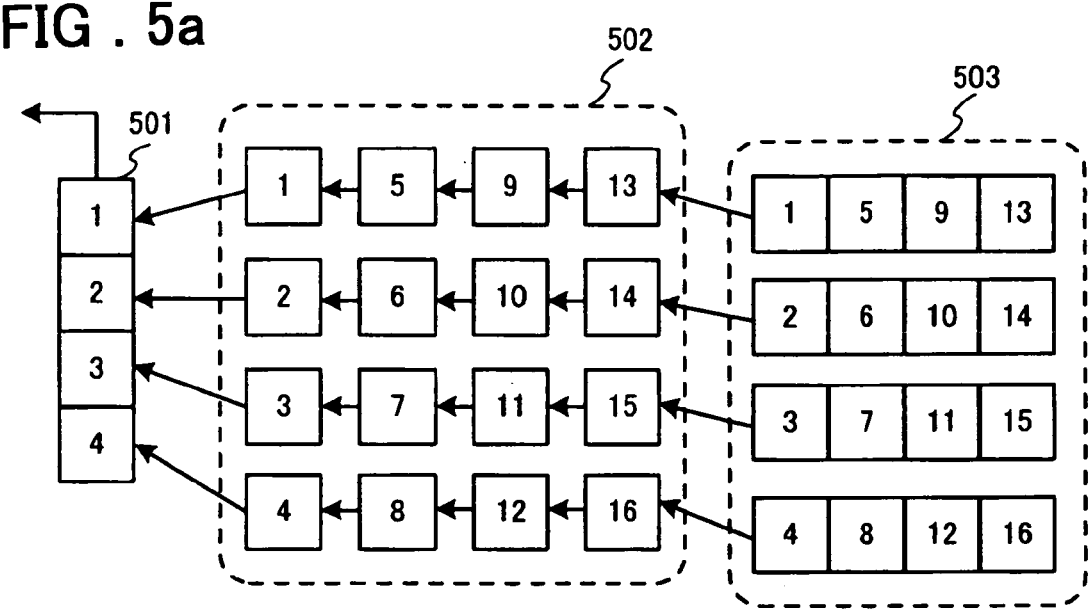
FIGS. 5a and 5b include diagrams showing an image of data rearrangement at the time of data reading and an image of data rearrangement at the time of data writing, in this embodiment.
Figure 5B:
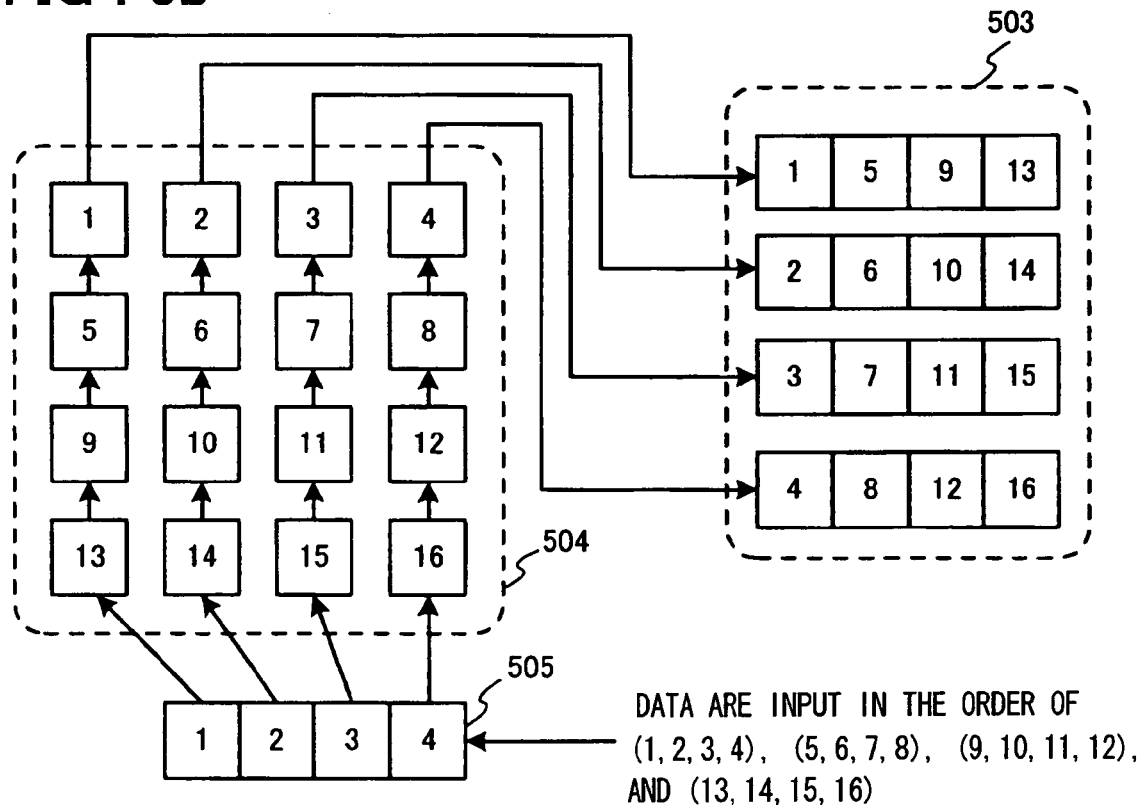

FIGS. 5a and 5b show an image of data rearrangement at the time of data reading and an image of data rearrangement at the time of data writing, respectively, in this embodiment. Reference numerals 501 and 502 in FIG. 5a and reference numerals 504 and 505 in FIG. 5b correspond to the data rearrangement means 103 in FIG. 1, and reference numeral 503 in FIG. 5 corresponds to the storage means 104 in FIG. 1. For simplicity, it is assumed in FIG. 5 that there are four physical storage regions each having four data storage areas, and the four physical storage regions have 4×4=16 data storage areas.

Since data are stored in the storage means 503 according to the data storage method in FIG. 4, the data stored in the four physical storage regions in the storage means 503 are temporarily stored in four routes provided in the data rearrangement means 502, respectively, at the time of data reading. Then, during transition from the means 502 to the means 501, rearrangement in the order of the data 1, the data 2, the data 3, and data 4 is performed, for output, first. Then, fifth data to eighth data, ninth data to twelfth data, and thirteenth data to sixteenth data are sequentially read out.

On the other hand, at the time of data writing, write data is stored in the storage means 503 through the data rearrangement means 505 and 504. When a data string (1, 2, 3, 4) is input to the means 505, for example, data rearrangement is so performed that these four units of data pass through different routes within the means 504, respectively, and then, four units of data in (5, 6, 7, 8), (9, 10, 11, 12), and (13, 14, 15, 16) pass through the different routes within the means 504, respectively. Then, each data string in each route is collectively stored in each of the physical storage regions of the storage means 503.

FIG. 6 shows an example in which the data rearrangement means at the time of the data reading in FIG. 5*a* has been implemented by a shift register.

Figure 6A:
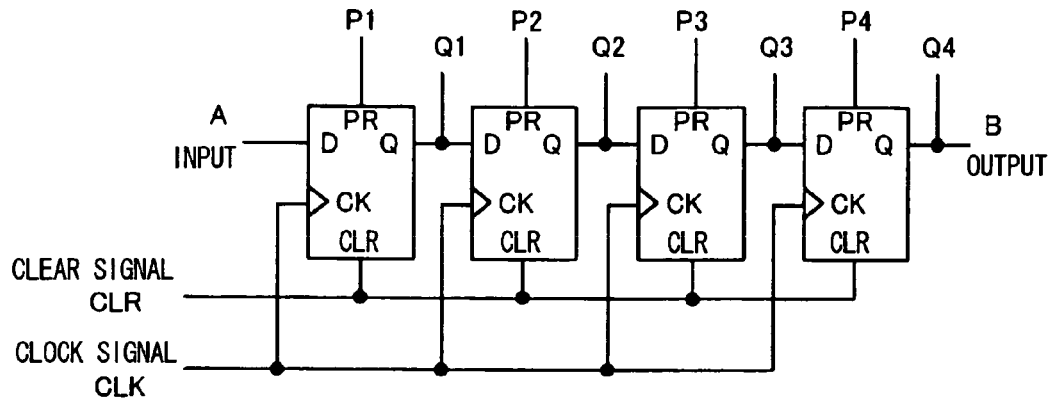
FIGS. 6a, 6b and 6c include diagrams showing an example where data rearrangement means at the time of data reading in this embodiment has been implemented by a shift register.
Figure 6B:
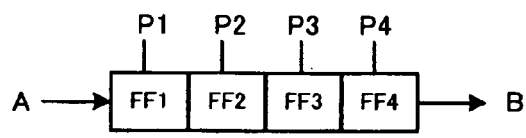
Figure 6C:
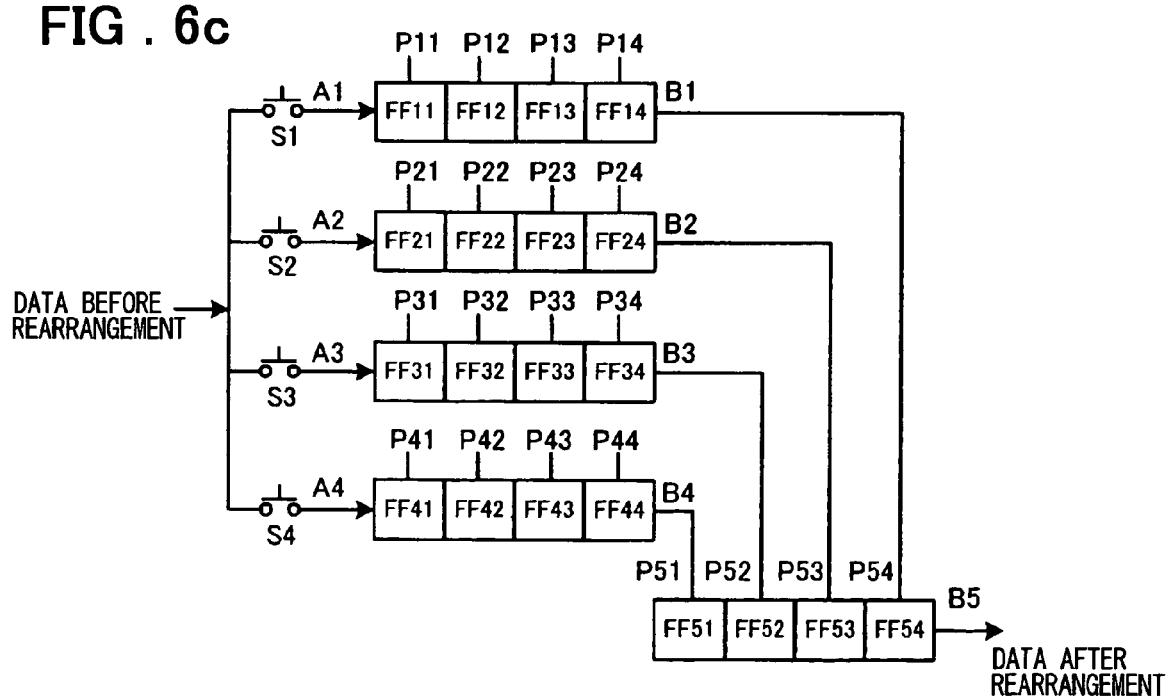

FIG. 6*a* shows a common circuit of a four-bit shift register constituted from four D-type flip-flops. Assume that this is illustrated by a diagram as shown in FIG. 6*b*. Then, the circuit for data rearrangement shown in FIG. 5*a* can be implemented by a circuit in which respective outputs from the four four-bit shift registers are connected to respective preset terminals of another one four-bit shift register.

It is assumed herein that in the storage means 104, data are stored, as shown in the means 503 in FIG. 5*a*, for example, and the storage means 104 has the function of performing collective reading in the unit of the physical storage region. At first, data are collectively read out in the order of (1, 5, 9, 13) as the data before rearrangement. At this point of time, among switches S1 to S4, only the switch S1 is switched ON, and data are sequentially stored in FF11 to FF14. Next, a data string (2, 6, 10, 14) with only the switch S2 switched ON is read out. Then, a data string (3, 7, 11, 15) is sequentially read out with only the switch S3 switched ON, and a data string (4, 8, 12, 16) is sequentially read out with only the switch S4 switched ON.

When data are stored in all of the 16 flip-flops FF11 to FF14, flip-flops FF21 to FF24, flip-flops. FF31 to FF34, and flip-flops FF41 to FF44, control is performed so that FF51 to FF54 operate next. Since outputs B1 to B4 are connected to the preset terminals of the FF51 to FF55, data are sequentially taken out. More specifically, a data string (1, 2, 3, 4) is set in the FF51 to FF54 at a first timing, and then output through B5. Further, at a next timing, the next outputs B1 to B4 are set in the FF 51 to FF54, and a data string (5, 6, 7, 8) is taken out. Then, the data are taken out in the order of a data string (9, 10, 11, 12) and a data string (13, 14, 15, 16) in the same manner.

A rearrangement circuit for data writing can also be readily implemented by a circuit configuration using a shift register in the same manner as in FIG. 6 according to the image in FIG. 5*b*.

In this embodiment, a sequence of data is split across a plurality of physical storage regions for storage without being stored in one physical storage region in the storage device constituted from the plurality of physical storage regions and in which data writing operations or data reading operations are collectively executed in the unit of one physical storage region. Thus, even if only the storage device for which writing has been performed is connected to other system, data cannot be read out normally. Therefore, by encrypting the order of data storage, for example, the present invention can be utilized for security applications.

Figure 7:
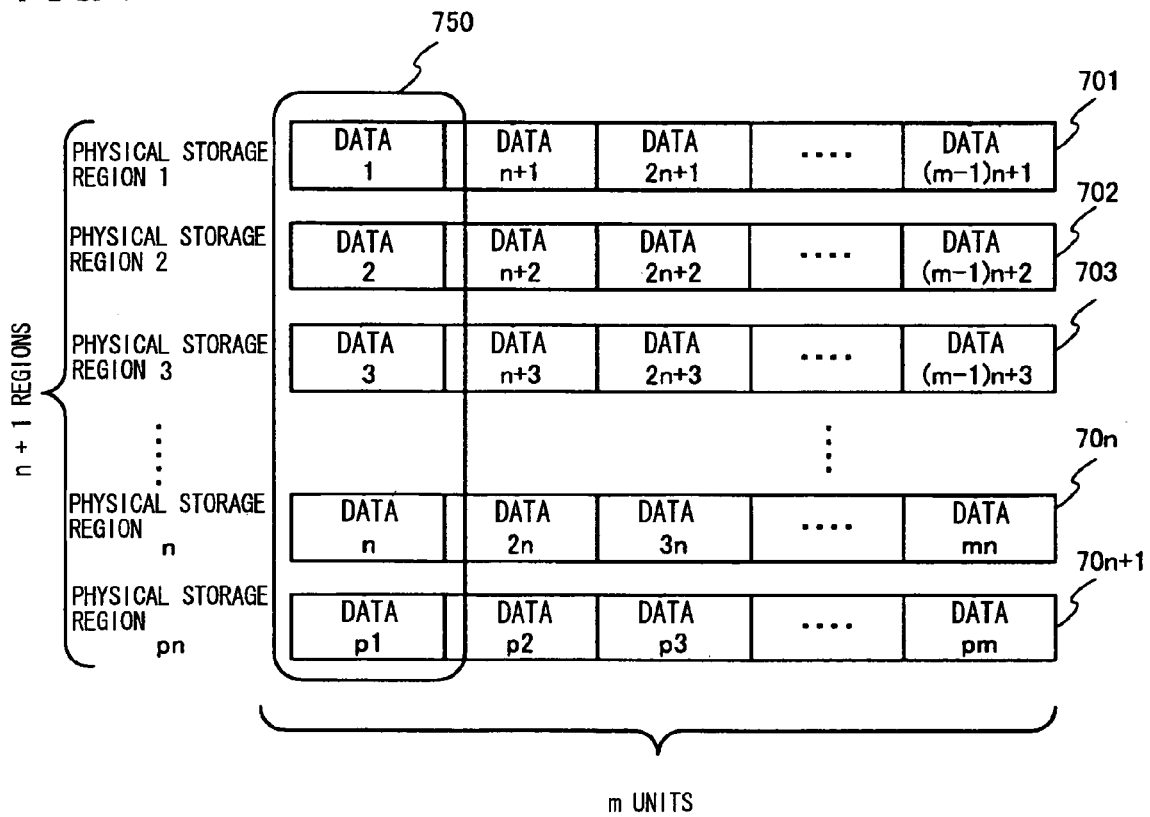
FIG. 7 is a diagram showing a method of storing data and error correction data in a second embodiment of the present invention.
Figure 8:
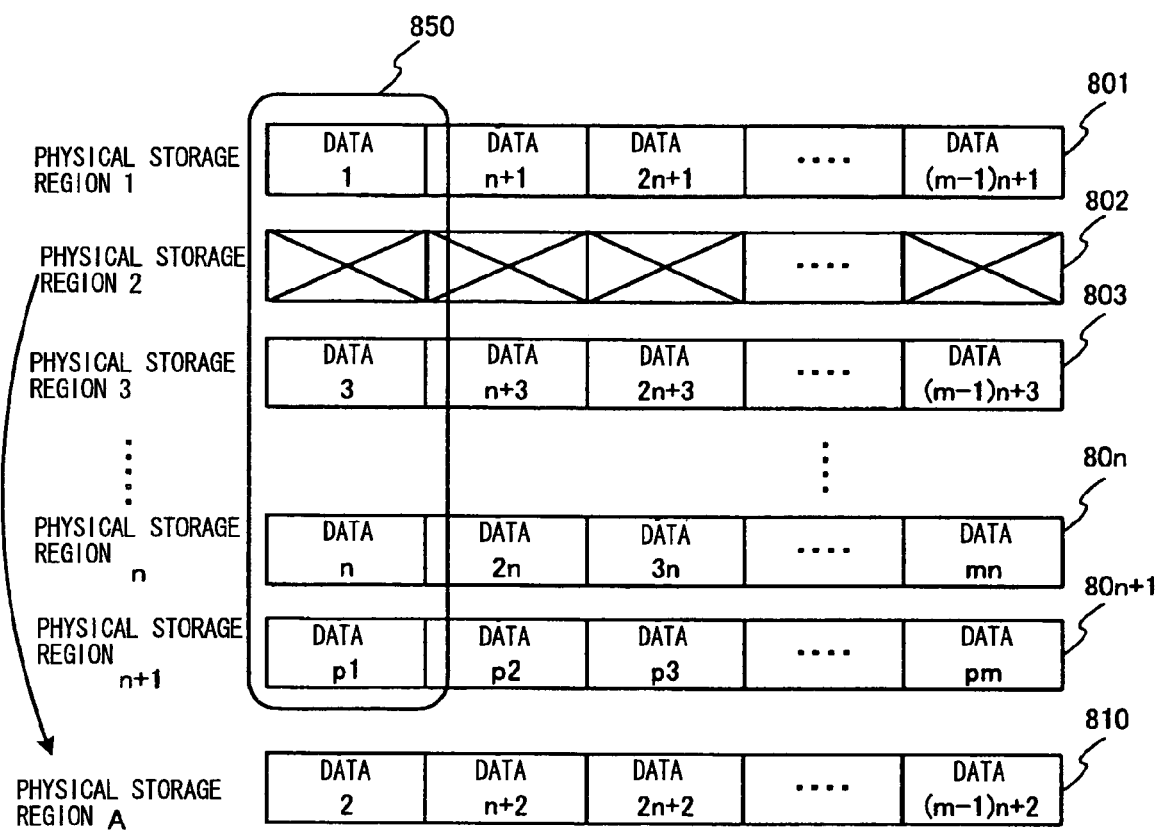
FIG. 8 is a diagram for explaining an example of an operation in this embodiment.

FIG. 7 is a diagram showing a second embodiment of the present invention, and a method of storing data and error correction data in this embodiment. FIG. 8 shows an alternative image of a physical storage region when an error occurs, in this embodiment.

Generally, in the flash memory or the like, error detection and error correction are performed by adding redundant data such as a parity to each arbitrary data unit for data error correction. Part or all of data to be paired with this error correction data is stored in one physical storage region. Thus, when a data error or the like has occurred due to a defect in the physical storage region, there arises the problem that most of a group of data stored in this physical storage region is lost and execution of the error correction thereby becomes impossible.

In this embodiment, a sequence of data is split across and spread over a plurality of physical storage regions for storage without being stored in the unit of one physical storage region, a physical storage region for storing error correction data is added, and the error correction data for the data stored in the plurality of physical regions are collectively stored in this physical storage region. Thus, even if data reading from one or the arbitrary number of error correctable physical storage regions has become impossible, the error correction can be readily performed, and data restoration becomes possible. A method of restoring data in a data storage system in this embodiment will be described below.

FIG. 7 shows storage means having (n+1) physical storage regions each having m data storage areas, and this storage means includes a total of (m)×(n+1) data storage areas. With the data 1 to the data n regarded as a group, error correction data for the group of data is stored in another (n+1)th physical storage region as data p1. Likewise, error correction data p2 for the data n+1 to the data 2n, . . . , and error correction data pm for the data (m−1)n+1 to the data mn are stored.

By storing data as described above, when an anomaly is generated in the data stored in the second physical storage region in FIG. 7, for example, the data restored by error correction is stored in an alternative physical storage region A as shown in FIG. 8, and return to a normal state becomes possible. Various types of common-used error correction data can be employed as this error corrected data, according to the importance of data, the amount of data that can be added, the size of the circuit, or the like. Among its typical examples are a CRC (Cyclic Redundancy Code) such as a parity and a cyclic code, a BCH code, an RS (Reed-Solomon) code, and the like.

Figure 9:
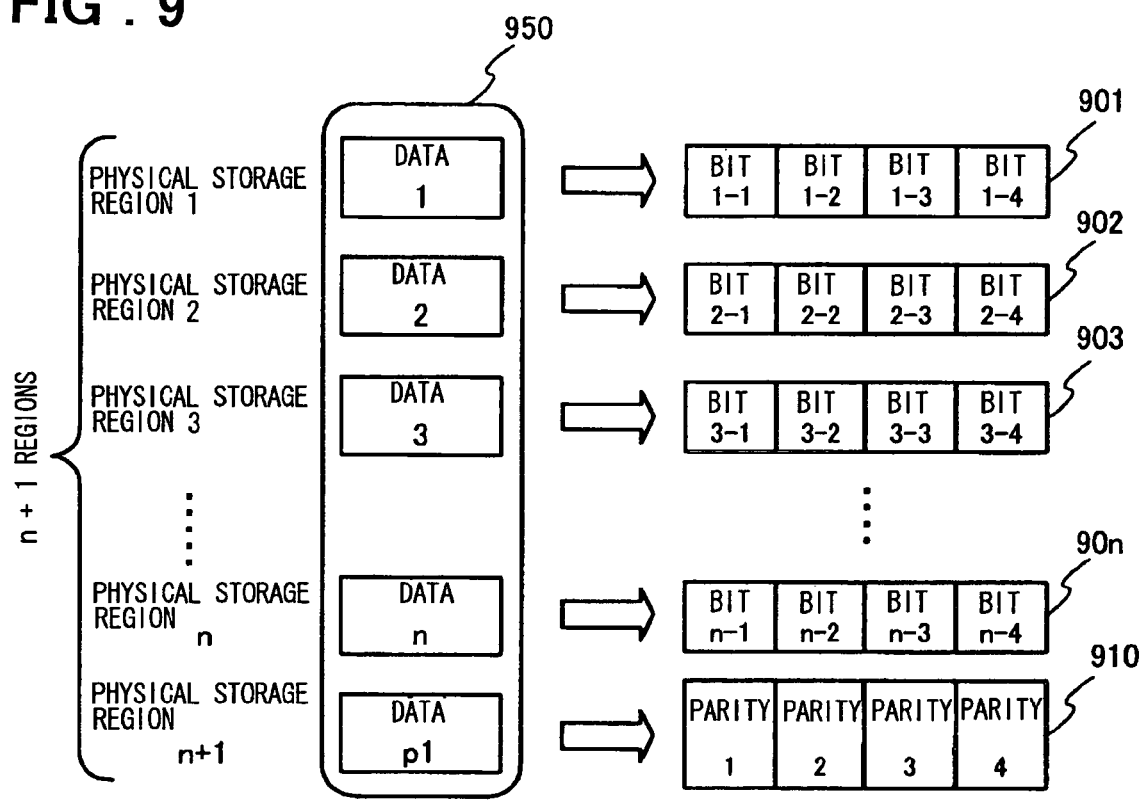
FIG. 9 is a diagram for explaining an example of an operation in this embodiment.

A description is given to a case where one data storage area is constituted from four bits, and data correction is performed using the parity, with reference to FIG. 9. When the data 1 is constituted from a bit 1-1, a bit 1-2, a bit 1-3, and a bit 1-4, when the data 2 is constituted from a bit 2-1, . . . , and when the nth data is constituted from a bit n-1, a bit n-2, a bit n-3, and a bit n-4, as shown in FIG. 9, a parity 1 is determined for a data string grouping the bit 1-1, bit 2-1, . . . , and bit n-1. Likewise, a parity 2, a parity 3, and a parity 4 are determined, thereby enabling error correction.

Figure 10:
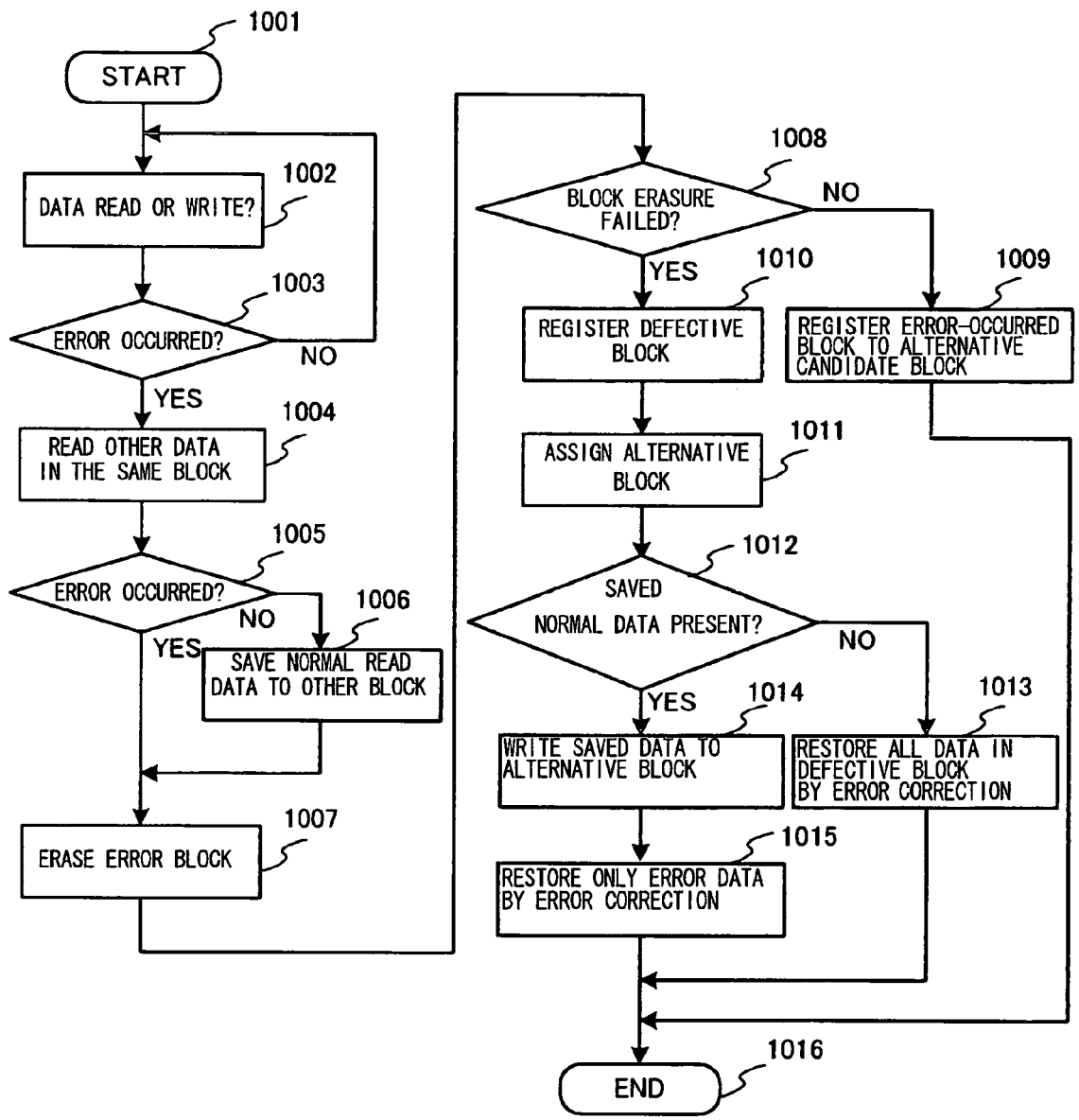
FIG. 10 is a flowchart showing a procedure for error correction in this embodiment.

FIG. 10 is a flowchart showing a procedure for error correction in this embodiment, and FIG. 11 includes image diagrams about this data restoration operation. The data restoration operation in this embodiment will be described with reference to FIGS. 7 to 11.

First, when occurrence of an error (indicating that a read cannot be performed or a write has failed) is detected (YES at 1003) while a read or a write is performed on data stored in a data storage area i ($1 \leq i \leq mn$) (at 1002), in order to determine whether this defect is caused by one overall physical storage region (block) in which data i is included, or caused only by the specific data storage area in which the data i is stored, other data in the same block is first read (at 1004).

When errors in all of the other data or an arbitrarily set number of errors are present in the same block (YES at 1005), it is probable that the defect described above is caused by the one overall physical storage area (block) in which the data i is included. Thus, the data stored in this block are not used, and erasure of the error block as it is performed (at 1007). Otherwise, the defect described above is regarded to be caused only by the specific data storage area in which the data i is stored. Then, only the data normally read are saved to other block (at 1006), and then erasure of the error block is performed (at 1007).

Then, it is determined whether erasure of the block has failed or not (at 1008). When it is determined that the erasure of the block has succeeded (NO at 1008), the block that has caused the error is registered in an alternative candidate block (at 1009). This alternative candidate block is the candidate for a block to be used in place of a defective block when the defective block has occurred, and is usually managed by a memory management system implemented by software. When it is determined (at 1008) that the erasure of the block has failed (YES at 1008), the block in question is registered (at 1010) as the defective block and is managed so as not to be used from then on.

Figure 11A:
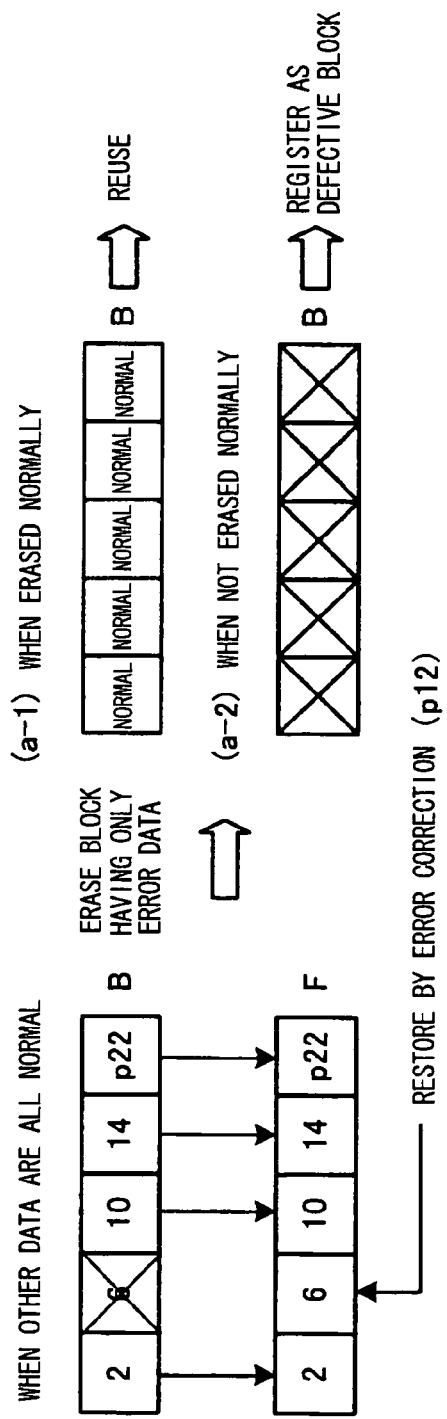
FIGS. 11a and 11b include diagrams showing images of operations of restoring data in this embodiment.
Figure 11B:
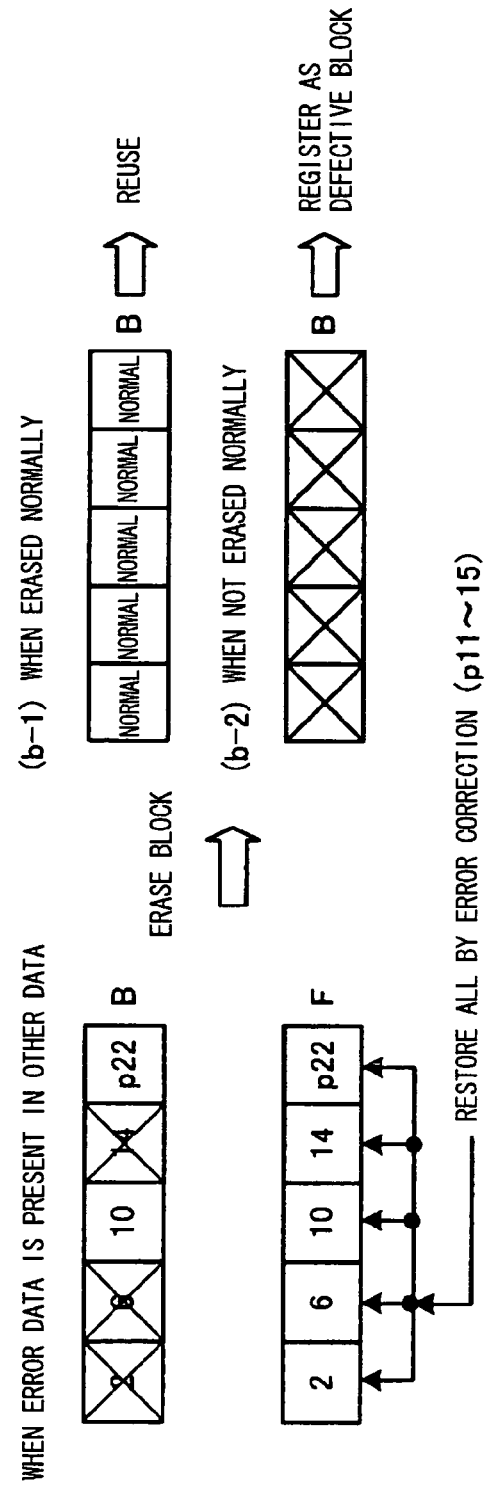

Then, an alternative block is assigned (at 1011). Next, data is restored to the alternative block. First, it is checked (at 1012) whether there is the data saved at step (1006) is or not. When it is determined that there is no saved data, all the data stored in the defective block are simply restored (at 1013), based on the data and the error correction data (parities) of the remainder of the blocks (as shown in FIG. 11*b*). When it is determined that there is the saved data, the saved data is written into the alternative block (at 1014), and only error data that is not saved is restored by error correction (as shown in FIG. 11*a*).

By the operations as described above, when an error of data occurs in only one physical storage region (block), the data is restored. As described above, this embodiment has the operation of identifying the defective block, such as reading other data in the same block that has caused an error. Thus, even just by providing for one data string a parity detection bit of one bit by which only error detection can be normally performed as shown in FIG. 9, error detection becomes possible.

By dynamically performing the operations described above, data can be quickly restored when a defect has occurred in a group of the physical storage areas in which various defects may occur. These various defects include a defect at the time of manufacture, a malfunction generated in a specific area such as damage caused by electrical migration or static electricity, a defective control circuit, and a malfunction due to the influence of stability of the supply voltage. Further, the supervisory host can cause data reading and writing to be stably performed without being aware of it. Further, when the defect is the one in which even the defective block can be reused by erasure or the like, the defective block can be utilized as the alternative candidate block.

Incidentally, during execution of the operations described above, even the defective block was described to be made to be the alternative candidate block if it is reusable by erasure or the like. Reliability, however, can also be enhanced by performing control so that when a defect has occurred in the same block arbitrary set times or more, the defective block will not be used from then on.

Figure 12:
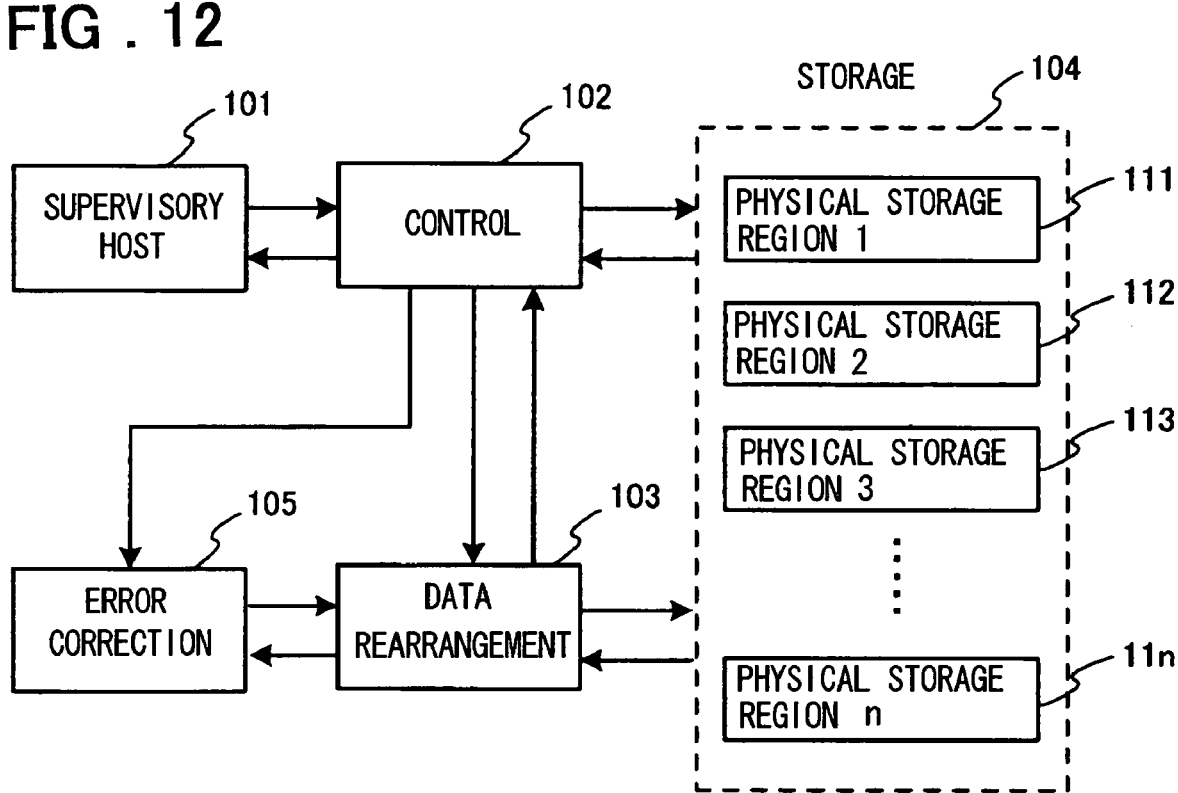
FIG. 12 is a block diagram of a data storage system showing a third embodiment of the present invention.

FIG. 12 is a block diagram of a data storage system showing other embodiment of the present invention.

Though the basic configuration of this embodiment is the same as those of the above embodiments, this embodiment is characterized by adding hardware error correction means (unit) 105. The error correction means 105 is the means for performing error correction on data input to the data rearrangement means 103. Further, the error correction means 102 receives directions about control over whether to perform error correction or not and control over an error correction method, from the control means 102. The error correction means 105 also has the function of error detection.

Figure 13:
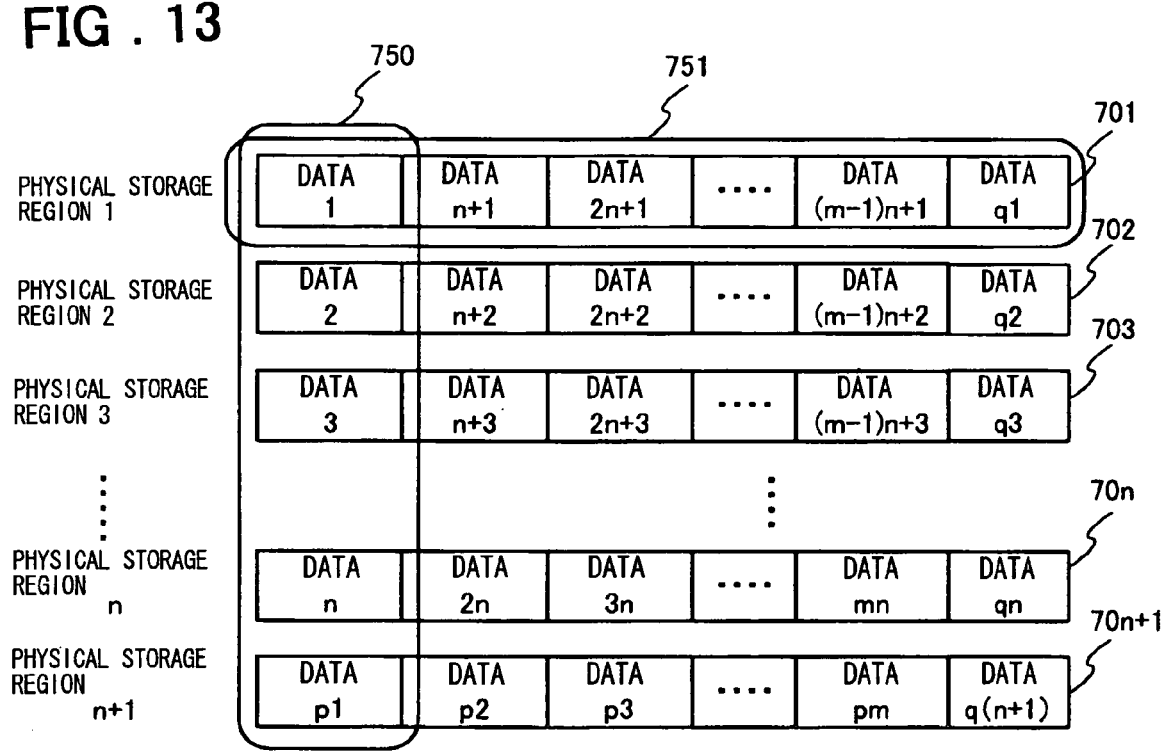
FIG. 13 is a diagram showing an example of a method of storing data and error correction data in this embodiment.
Figure 14:
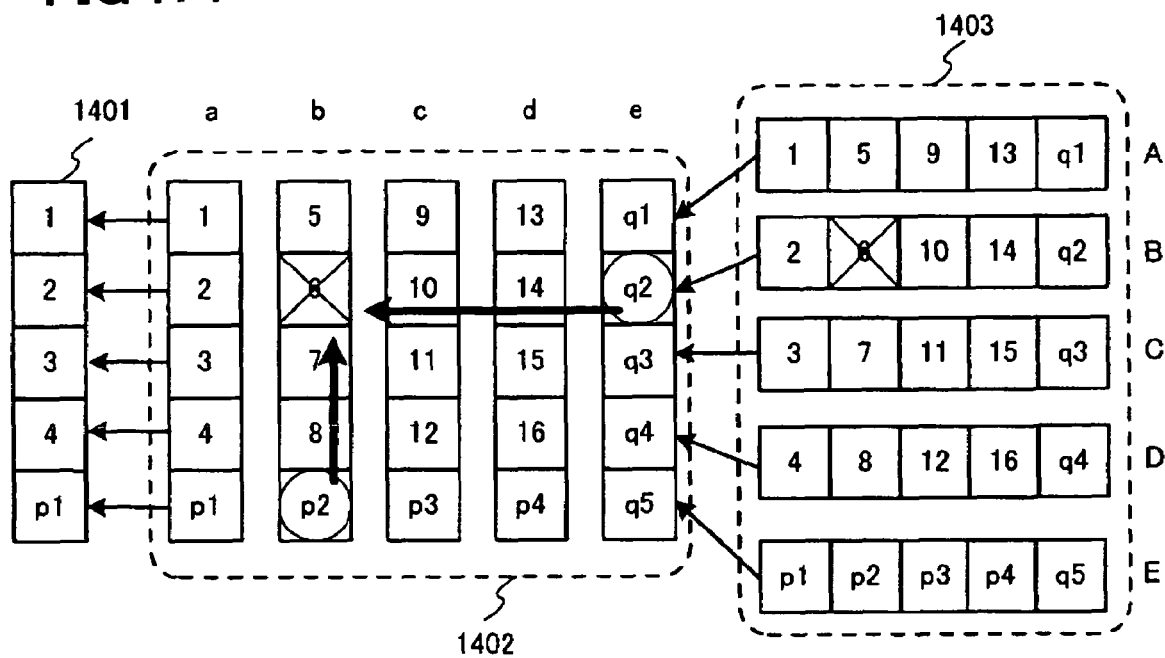
FIG. 14 is a diagram showing an error correction operation in this embodiment.

FIG. 13 shows an example of a method of storing data and error correction data in this embodiment, and FIG. 14 shows an error correcting operation in this embodiment. An operation of this embodiment will be described with reference to FIGS. 12 to 14.

As shown in FIG. 13, when data are stored in this embodiment, error correction data for a data string constituted from the data 1, data 2, data 3, . . . , and nth data, extending across the physical storage regions is stored as p1, for storage, as in FIG. 7. In this embodiment, however, error correction data for a data string constituted from the data 1, data n+1, data 2 n+1, . . . , and data (m−1)n+1, which are the data in the first physical storage region, is stored as q1. Likewise, p2 to pm, and q2 to q(n+1) are stored. By arranging the error correction data as described above, when the parity is used as the error correction data, for example, direct error correction can be performed without identifying a defective physical storage region.

A specific description will be given with reference to FIG. 14. Herein, reference numeral 1403 denotes storage means, and reference numerals 1401 and 1402 denote data rearrangement means (unit). Assume that a defect is present in data 6 in the storage means 1403. Then, when the data is input to the data rearrangement means 1402, error detection is performed by the error correction means 105. Then, when an error is detected, error correction is performed. When the parity or the like is used, error detection and correction are performed using the error correction data p2 and q2, as shown in FIG. 14.

As described above, the hardware error correction means is provided in this embodiment. Thus, even when a more complex error correction method is employed, the effect of the fast error correction processing speed can be obtained.

In the above-mentioned embodiments, a description was directed to the example where the shift register was used for the data rearrangement means. The data rearrangement means is not limited to this example, and by using an SRAM (Static RAM), the flash memory, an EEPROM (Electronically Erasable and Programmable ROM), or the like, rearrangement using software can also be performed. In such a case, by adding the error correction data in biaxial directions (e.g. orthogonal ordinates), as shown in FIG. 13, the effect is obtained in which, even if a defect for each of the physical storage regions is present in the memory as the rearrangement means, similar restoration becomes possible.

In the above embodiments, error correction data for one data storage area was used. However, the error correction data for a plurality of data storage areas can also be provided for one data string, according to the method of error correction. Further, in the case of a flash memory LSI in which a plurality of flash memories are stacked into one package for inclusion, the physical storage region from a narrow point of view is the block, and the physical storage region from a larger broader of view is one flash memory itself.

In such a case, it is clear that the present invention can be applied through division into two hierarchy layers. Further, since it takes time to perform data rearrangement and error correction in this embodiment, this embodiment produces the greatest effect when used to be applied to only one portion of a file management area, important user data, or the like that will be much damaged due to data destruction.

It is clear that the present invention is not limited to the embodiments described above, and the respective embodiments can be modified as necessary within the scope of the technical concepts of the present invention.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A method of data writing to and data reading from a storage device, the method comprising:
   providing a storage device including storage means comprising a plurality of physical storage regions each including a plurality of data storage areas, an operation of the data writing or the data reading being collectively performed for each of said plurality of physical storage regions, arranging, when data storage in said storage means is performed, a sequence of data input from a supervisory host to be written in said each of said plurality of physical storage regions in a fashion split across said plurality of physical storage regions, for writing;
   rearranging when the data reading from said storage means is performed, the data collectively read from said each of said plurality of physical storage regions so as to return the data collectively read to said input sequence of data, for output;
   providing an error correcting physical storage region for storing error correction data written therein, said error correction data being provided for correcting errors of the data respectively written into corresponding positions of said plurality of physical storage regions;
   checking, when one of the errors is detected in one of the data stored in said plurality of physical storage regions, all of the data in one of said plurality of physical storage regions with the data error detected therein; and
   saving and writing a normal one of the data into a corresponding position in an alternative physical storage region.

2. The method of data writing to and data reading from a storage device according to claim 1, wherein the method further comprises:
   correcting data having the error using the error correction data in said error correcting physical storage region and writing into a corresponding position in said alternative physical storage region; and
   erasing all the data in said one of said plurality of physical storage regions in which the data error has been detected.

3. The method of data writing to and data reading from a storage device according to claim 2, wherein when the erasure of all the data in said one of said plurality of physical storage regions in which the data error has been detected has succeeded, said one of said plurality of physical storage regions is registered as an alternative candidate storage region, and when the erasure of all the data in said one of said plurality of physical storage regions in which the data error has been detected has failed, said one of said plurality of physical storage regions is registered as a defective physical storage region.

4. The method of data writing to and data reading from a storage device according to claim 2, wherein only data determined not to be the normal data is restored using the step of correcting data.

5. The method of data writing to and data reading from a storage device according to claim 2, wherein the step of checking includes checking all of the data in the one of said plurality of physical storage regions with the data error detected therein for normal data which is normally read without error, such that the detected normal data is saved and written to the alternative physical storage region without being corrected using the error correction data.

6. The method of data writing to and data reading from a storage device according to claim 1, wherein an error correcting physical storage region with first error correction data written therein is provided,
   said first error correction data being provided for performing error detection and error correction of the data respectively written into corresponding positions of said plurality of physical storage regions;
   an error correction data storage area with second error correction data written therein is provided for said each of said plurality of physical storage regions;
   said second error correction data being provided for error detection and error correction of the data written in said each of said plurality of physical storage regions; and
   error detection and correction of the data read out from said plurality of physical storage regions are performed using the first and second error correction data.

7. The method of data writing to and data reading from a storage device according to claim 1, wherein the step of checking includes checking all of the data in the one of said plurality of physical storage regions with the data error detected therein for normal data which is normally read without error, such that the detected normal data is saved and written to the alternative physical storage region without being corrected using the error correction data.

8. The method of data writing to and data reading from a storage device according to claim 7, wherein only the data having the error within the one of said plurality of physical storage regions with the data error detected therein is corrected using the error correction data.

9. The method of data writing to and data reading from a storage device according to claim 7, wherein all of the data in the one of said plurality of physical storage regions with the data error detected therein is checked to be the normal data after the data error is detected.

10. A data storage system comprising:
    storage means comprising a plurality of physical storage regions each comprising a plurality of data storage areas, an operation of data writing or data reading being collectively performed for each of said plurality of physical storage regions;
    rearrangement means comprising a function of rearranging data input from a supervisory host to be written to said storage means, for output to said storage means and a function of rearranging the data read from said storage means, for output to said supervisory host; and
    control means for controlling operations of said storage means and said rearrangement means; wherein
    said rearrangement means comprises a function of rearranging a sequence of the data input from said supervisory host to be written in said each of said plurality of physical storage regions, thereby splitting the rearranged data across said plurality of physical storage regions, for writing, and a function of rearranging the data collectively read from said each of said plurality of physical storage regions again, thereby returning the rearranged data to said input sequence of data, for output, wherein an error correcting physical storage region with error correction data written therein is provided for said storage means, said error correction data being provided for correcting errors of the data respectively written into corresponding positions of said plurality of physical storage regions; and said control means has a function of performing control so that when one of the errors is detected in one of the data stored in said storage means, all of the data in one of said plurality of physical storage regions with said one of the errors detected therein are checked, and the data determined to be normal as a result of the check is saved and written into a corresponding position in an alternative physical storage region and the data determined to have the error is corrected using the error correction data in said error correcting physical storage region and is written into a corresponding position in said alternative physical storage region.

11. The data storage system according to claim 10, wherein all the data in said one of said plurality of physical storage regions in which the data error has been detected are erased.

12. The data storage system according to claim 11, wherein said control means has functions of:

registering said one of said plurality of physical storage regions in which the data error has been detected as an alternative candidate storage region when the erasure of all the data in said one of said plurality of physical storage regions has succeeded, and registering said one of said plurality of physical storage regions as a defective physical storage region when the erasure of all the data in said one of said plurality of physical storage regions in which the data error has been detected has failed.

13. The data storage system according to claim 10, wherein for said storage means, an error correcting physical storage region with first error correction data written therein is provided, said first error correction data being provided for performing error detection and error correction of the data respectively written into corresponding positions of said plurality of physical storage regions, and an error correction data storage area with second error correction data written therein is provided for said each of said plurality of physical storage regions, said second error correction data being provided for error detection and error correction of the data written in said each of said plurality of physical storage regions; and said data storage system comprises:

error correction means for performing error correction of the write data including the first and second error correction data, read from said storage means and then input to said data rearrangement means.

14. The data storage system according to claim 10, wherein the data determined to be normal as a result of the check is data which is normally read without error, such that the detected normal data is saved and written to the alternative physical storage region without being corrected using the error correction data.

15. The data storage system according to claim 10, wherein only the data determined to have the error within the one of said plurality of physical storage regions with the data error detected therein is corrected using the error correction data.

16. The data storage system according to claim 10, wherein all of the data in the one of said plurality of physical storage regions with the data error detected therein is checked to be the normal data after the data error is detected.

17. The data storage system according to claim 10, wherein only data determined not to be the normal data is restored using the error correction data.

* * * * *